(12) United States Patent
Gao

(10) Patent No.: US 11,736,237 B2
(45) Date of Patent: Aug. 22, 2023

(54) DATA TRANSMISSION METHOD, TERMINAL DEVICE AND NETWORK DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 144 days.

(21) Appl. No.: 17/043,546

(22) PCT Filed: Mar. 27, 2019

(86) PCT No.: PCT/CN2019/079842
§ 371 (c)(1),
(2) Date: Sep. 29, 2020

(87) PCT Pub. No.: WO2019/184943
PCT Pub. Date: Oct. 3, 2019

(65) Prior Publication Data
US 2021/0099255 A1     Apr. 1, 2021

(30) Foreign Application Priority Data

Mar. 30, 2018 (CN) .......................... 201810276760.3

(51) Int. Cl.
*H04L 1/18* (2023.01)
*H04L 1/1812* (2023.01)
(Continued)

(52) U.S. Cl.
CPC .......... *H04L 1/1812* (2013.01); *H04L 1/1607* (2013.01); *H04L 1/1861* (2013.01); *H04L 5/0055* (2013.01); *H04W 72/23* (2023.01)

(58) Field of Classification Search
CPC ... H04L 1/1812; H04L 1/1607; H04L 1/1861; H04L 1/1854; H04L 1/89; H04L 1/16;
(Continued)

(56) References Cited

U.S. PATENT DOCUMENTS

2015/0131579 A1* 5/2015 Li ........................... H04L 1/189
370/329
2016/0337086 A1 11/2016 Shen et al.
(Continued)

FOREIGN PATENT DOCUMENTS

CN        104811283 A      7/2015
CN        105308892 A      2/2016
(Continued)

OTHER PUBLICATIONS

First Office Action and search report from CN app. No. 201810276760. 3, dated Feb. 19, 2020, with English translation provided by Global Dossier.

(Continued)

*Primary Examiner* — Brenda H Pham
(74) *Attorney, Agent, or Firm* — Ladas & Parry, LLP

(57) ABSTRACT

A data transmission method, a terminal device and a network device are provided. The method includes: receiving PDSCH; determining a size of a semi-static HARQ-ACK codebook according to a number of repetition transmissions of the PDSCH; and performing a corresponding HARQ-ACK feedback for the PDSCH with repetition transmissions according to the determined size of the semi-static HARQ-ACK codebook.

20 Claims, 7 Drawing Sheets

(51) Int. Cl.
  *H04L 1/1607* (2023.01)
  *H04L 1/1829* (2023.01)
  *H04L 5/00* (2006.01)
  *H04W 72/23* (2023.01)

(58) Field of Classification Search
  CPC ...... H04L 5/00; H05L 5/0055; H04W 72/042; H04W 72/0446; H04W 72/1273; H04W 72/1284
  See application file for complete search history.

(56) References Cited

U.S. PATENT DOCUMENTS

| | | | |
|---|---|---|---|
| 2016/0345199 A1 | 11/2016 | Nogami et al. | |
| 2017/0134124 A1 | 5/2017 | Lee et al. | |
| 2017/0353272 A1 | 12/2017 | Takeda et al. | |
| 2018/0019843 A1 | 1/2018 | Papasakellariou | |
| 2019/0028242 A1 | 1/2019 | Xiao et al. | |
| 2019/0082351 A1* | 3/2019 | Nammi | H04L 1/1858 |
| 2019/0159251 A1 | 5/2019 | Li et al. | |
| 2020/0366417 A1* | 11/2020 | Lei | H04L 1/1685 |
| 2020/0374048 A1* | 11/2020 | Lei | H04L 1/1896 |

FOREIGN PATENT DOCUMENTS

| | | |
|---|---|---|
| CN | 107332646 A | 11/2017 |
| WO | 2016162791 A1 | 10/2016 |
| WO | 2017161541 A1 | 9/2017 |

OTHER PUBLICATIONS

International Search Report from PCT/CN2019/079842, dated Jun. 5, 2019, with English translation from WIPO.

Written Opinion of the International Searching Authority from PCT/CN2019/079842, dated Jun. 5, 2019, with English translation from WIPO.

International Preliminary Report on Patentability from PCT/CN2019/079842, dated Oct. 6, 2020, with English translation from WIPO.

"Discussion on HARQ-ACK multiplexing and bundling for NR", R1-1720876, 3GPP TSG RAN WG1 Meeting 91, Reno, USA, Nov. 27-Dec. 1, 2017.

"Remaining details on HARQ-ACK transmission", R1-1802108, 3GPP TSG RAN WG1 Meeting #92, Athens, Greece, Feb. 26-Mar. 2, 2018.

"PDSCH related techniques for LTE URLLC", R1-1802181, 3GPP TSG RAN WG1 Meeting #92, Athens, Greece, Feb. 26-Mar. 2, 2018.

First Office Action for Korean Patent Application 10-2020-7031284 dated Jun. 29, 2022 by the Korean Patent Office, and its English translation provided by foreign associate.

"Open issues on HARQ-ACK feedback," 3GPP TSG RAN WG1 Meeting AH 180, R1-1800258, Vancouver, Canada, Jan. 22-26, 2018, Source: CATT, Agenda Item: 7.3.3.2, all pages.

The Extended European Search Report for European Patent Application No. 22195053.8 dated Dec. 15, 2022 by the European Patent Office.

* cited by examiner

DATA TRANSMISSION METHOD, TERMINAL DEVICE AND NETWORK DEVICE

CROSS-REFERENCE TO RELATED APPLICATIONS

The present application is a U.S. national phase application of a PCT Application No. PCT/CN2019/079842 filed on Mar. 27, 2019, which claims a priority to Chinese patent application No. 201810276760.3 filed on Mar. 30, 2018, the disclosures of which are incorporated in their entireties by reference herein.

TECHNICAL FIELD

The present disclosure relates to the technical field of communication technology, in particular to a data transmission method, a terminal device and a network device.

BACKGROUND

With the development and change of mobile communication service requirements, organizations such as the International Telecommunication Union (ITU) and the 3rd Generation Partnership Project (3GPP) have begun to study new wireless communication systems, such as the fifth generation New wireless communication system (5 Generation New Radio, 5G NR).

The current 5G NR system supports flexible timing relationships. For the physical downlink shared channel (Physical Downlink Shared Channel, PDSCH), the physical downlink control channel (Physical Downlink Control Channel, PDCCH) that carries its scheduling information can indicate the scheduling timing between the PDSCH and the PDCCH and the Hybrid Automatic Repeat Request-Acknowledge (HARQ-ACK) timing relationship (HARQ-ACK timing) from PDSCH to the corresponding HARQ. Specifically, the time domain resource allocation indication field in the Downlink Control Information (DCI) format used by the PDCCH indicates the slot offset K0 between the slot where the PDSCH is located and the slot where the DCI is located; in the DCI format, PDSCH to HARQ-ACK feedback timing indication field indicates the quantity of slots K1 from PDSCH to HARQ-ACK. There are two formats of DCI for scheduling PDSCH, one is DCI format 1_0, and the other is DCI format 1_1. Among them, DCI format 1_0 is fallback DCI, its corresponding K1 set is fixed as {1,2,3,4,5,6,7,8}, DCI format 1_1 is non-fallback DCI, the corresponding K1 set is up to 8 values selected from the above-mentioned maximum K1 set, and it needs to at least contain the values in {0,1,2,3,4,5,6,7}. K1 can indicate a value to the terminal device through the 3-bit HARQ-ACK timing indicator field in the DCI, so the value can be dynamically changed.

The 5G NR system supports two HARQ-ACK codebook generation methods, semi-static method and dynamic method. The so-called HARQ-ACK codebook refers to HARQ-ACK feedback sequence generated by the downlink transmission with associated HARQ-ACK feedback on the same time domain location or uplink channel (including PDSCH and PDCCH indicating the release of downlink SPS resources, and the PDCCH indicating the release of downlink SPS resources can also be called SPS PDSCH release indication).

The semi-static HARQ-ACK codebook can determine the position set Mc of the downlink transmission for the HARQ-ACK feedback in the same slot n on each carrier c according to the HARQ-ACK timing value in the K1 set, and then determine HARQ-ACK codebook transmitted in slot n according to Mc. Specifically, the slot may be determined according to each K1 value for the slot n to perform HARQ-ACK feedback. In each of these slots, the maximum quantity of downlink transmissions in a slot with Time Division Multiplexing (TDM) can be further determined according to various time-domain positions in the pre-configured downlink time domain resource allocation information. For example, if a semi-static uplink and downlink slot structure is configured, and there is an uplink symbol in a transmission position in a slot determined according to a downlink time domain resource allocation information, the transmission position is not counted, so when there is an uplink and downlink resource conflict, the downlink transmission does not actually occur, or there is no PDCCH monitoring occasion (PDCCH monitoring occasion) in the slot for transmitting the scheduling information of the downlink transmission in the slot determined according to the scheduling timing K0, then the slot cannot be scheduled, the downlink transmission in this slot cannot be counted, only if the symbols determined according to the downlink time domain resource allocation information in a slot are all downlink or unknown symbols and there is a PDCCH monitoring timing in the slot that sends scheduling information corresponding to this slot, it means that the downlink transmission can exist in the slot, so as to determine the maximum quantity of downlink transmissions of TDM transmission among the possible downlink transmissions in a slot, and so on, to determine the total quantity of downlink transmissions in multiple slots with associated HARQ-ACK feedback in slot n obtained based on K1 is taken as Mc, and the semi-static HARQ-ACK codebook transmitted in slot n is determined according to Mc, including the codebook size and HARQ-ACK specific content and order.

In the current 5G NR system, the size of the semi-static HARQ-ACK codebook is usually determined by the quantity of downlink transmissions with associated HARQ-ACK feedback in a slot, because the downlink transmission with associated HARQ-ACK feedback in a slot may be multiplexed as the downlink transmission in the time domain, that is, the quantity of downlink transmissions with associated HARQ-ACK feedback in a slot may be relatively large, so there may be more redundant information in the semi-static HARQ-ACK codebook determined according to the quantity of downlink transmission with associated HARQ-ACK feedback in a slot, resulting in poor transmission performance of HARQ-ACK feedback information.

SUMMARY

The present disclosure is to provide a data transmission method, a terminal device and a network device, which can solve the problem that there may be more redundant information in the semi-static HARQ-ACK codebook, resulting in poor transmission performance of HARQ-ACK feedback information.

In a first aspect, an embodiment of the present disclosure provides a data transmission method applied to a terminal device, including: receiving Physical Downlink Shared Channel (PDSCH); determining a size of a semi-static Hybrid Automatic Repeat Request-Acknowledge (HARQ-ACK) codebook according to a number of repetition transmissions of the PDSCH; and performing a corresponding HARQ-ACK feedback for the PDSCH with repetition transmissions according to the determined size of the semi-static HARQ-ACK codebook.

In a second aspect, a data transmission method applied to a network device, including: transmitting PDSCH; determining a size of a semi-static HARQ-ACK codebook according to a number of repetition transmissions of the PDSCH; receiving HARQ-ACK feedback information corresponding to the PDSCH with repetition transmissions according to the determined size of the semi-static HARQ-ACK codebook.

In a third aspect, a terminal device, including a transceiver, a memory, a processor, and a computer program stored on the memory and executed by the processor, wherein the transceiver is configured to receive PDSCH; the processor is configured to determine a size of a semi-static Hybrid Automatic Repeat Request-Acknowledge (HARQ-ACK) codebook according to a number of repetition transmissions of the PDSCH; and perform a corresponding HARQ-ACK feedback for the PDSCH with repetition transmissions according to the determined size of the semi-static HARQ-ACK codebook.

In a fourth aspect, a network device including a transceiver, a memory, a processor, and a computer program stored on the memory and executed by the processor, wherein the transceiver is configured to: transmit PDSCH; the processor is configured to determine a size of a semi-static HARQ-ACK codebook according to a number of repetition transmissions of the PDSCH; the transceiver is further configured to receive HARQ-ACK feedback information corresponding to the PDSCH with repetition transmissions according to the determined size of the semi-static HARQ-ACK codebook.

In a fifth aspect, a data transmission device applied to a terminal device, including: a first receiving module, configured to receive PDSCH; a first determining module, configured to determine a size of a semi-static HARQ-ACK codebook according to a number of repetition transmissions of the PDSCH; and a feedback module, configured to perform a corresponding HARQ-ACK feedback for the PDSCH with repetition transmissions according to the determined size of the semi-static HARQ-ACK codebook.

In a sixth aspect, a data transmission device applied to a network device, including: a transmission module, configured to transmit PDSCH; a second determining module, configured to determine a size of a semi-static HARQ-ACK codebook according to a number of repetition transmissions of the PDSCH; and a second receiving module, configured to receive HARQ-ACK feedback information corresponding to the PDSCH with repetition transmissions according to the determined size of the semi-static HARQ-ACK codebook.

In a seventh aspect, a terminal device including: a processor, a memory, and a program stored on the memory and running on the processor, wherein the program is executed by the processor to implement the steps of the data transmission method.

In an eighth aspect, a network side device, including: a processor, a memory, and a program stored on the memory and running on the processor, wherein the program is executed by the processor to implement the steps of data transmission method.

In a ninth aspect, a computer readable storage medium, wherein a program is stored on the computer readable storage medium, and the program is executed by a processor to implement the steps of the data transmission method.

In the embodiment of the present disclosure, the size of the semi-static HARQ-ACK codebook is determined according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the normal HARQ-ACK feedback of the PDSCH with repetition transmissions, and further based on the semi-static HARQ-ACK codebook, when corresponding HARQ-ACK feedback is implemented for the PDSCH with repetition transmissions, the transmission performance of HARQ-ACK feedback information can be improved.

BRIEF DESCRIPTION OF THE DRAWINGS

By reading the detailed description of the following alternative embodiments, various other advantages and benefits will become clear to those of ordinary skill in the art. The drawings are only used for the purpose of showing alternative embodiments, and are not considered as a limitation to the present disclosure.

DETAILED DESCRIPTION

The technical solutions in the embodiments of the present disclosure will be described clearly and completely with reference to the accompanying drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative work shall fall within the protection scope of the present disclosure.

Figure 1:
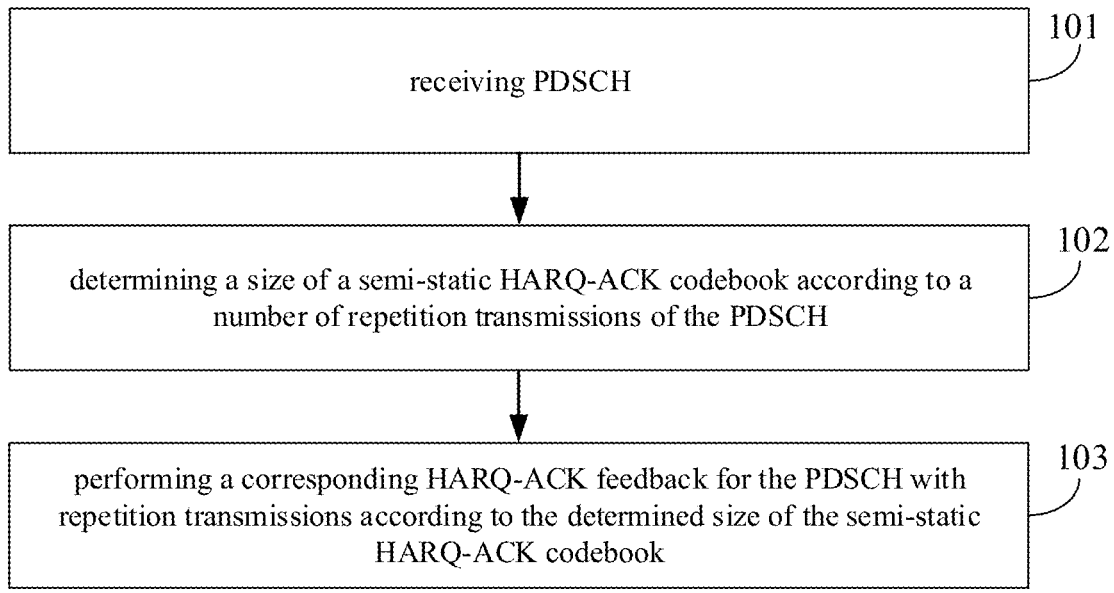
FIG. 1 is a schematic flowchart of a data transmission method according to an embodiment of the present disclosure.

As shown in FIG. 1, an embodiment of the present disclosure provides a data transmission method, which is applied to a terminal device, and includes the following steps.

Step 101: receiving PDSCH;

Step 102: determining a size of a semi-static HARQ-ACK codebook according to a number of repetition transmissions of the PDSCH;

Step 103: performing a corresponding HARQ-ACK feedback for the PDSCH with repetition transmissions according to the determined size of the semi-static HARQ-ACK codebook.

The HARQ-ACK feedback information corresponding to the PDSCH with repetition transmissions is the HARQ-ACK feedback information corresponding to the last transmission of the PDSCH with repetition transmissions, that is, the HARQ-ACK feedback information of the PDSCH obtained after the combination of multiple repetition transmissions.

In the embodiment of the present disclosure, the size of the semi-static HARQ-ACK codebook is determined according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the normal HARQ-ACK feedback of the PDSCH with repetition transmissions, and further based on the semi-static HARQ-ACK codebook, when corresponding HARQ-ACK feedback is implemented for the PDSCH with repetition transmissions, the transmission performance of HARQ-ACK feedback information can be improved.

In the embodiments of the present disclosure, when the terminal device determines the size of the semi-static HARQ-ACK codebook based on the quantity of downlink transmissions with associated HARQ-ACK feedback in a slot or in a physical uplink control channel (Physical Uplink Control Channel, PUCCH) in addition to the number of repetition transmissions of the PDSCH. Specifically, step 102 may include: determining the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; determining the size of the semi-static HARQ-ACK codebook according to the quantity of PDSCHs with repetition transmissions with associated HARQ-ACK feedback in a slot or in a PDCCH The quantity of downlink transmissions with associated HARQ-ACK feedback in a slot or in a PUCCH may be at least one of: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

It should be pointed out that the quantity of downlink transmissions with associated HARQ-ACK feedback in a slot or in a PUCCH can be determined for each carrier, that is, for each carrier, the above-mentioned method of determining the quantity of downlink transmissions is used to determine the quantity of downlink transmissions with associated HARQ-ACK feedback in a slot or in a PDCCH In addition, the quantity of downlink transmissions with associated HARQ-ACK feedback in a slot or in a PUCCH can be determined for a plurality of carriers. That is, in this process, for each carrier, corresponding downlink transmission set on each carrier is firstly determined according to the method of determining the quantity of downlink transmissions. Then the corresponding downlink transmission set on each of the multiple carriers are combined to determine the quantity of the downlink transmission of HARQ-ACK feedback in a slot or in a PDCCH Further, the terminal device determines the quantity of PDSCH with repetition transmissions with associated HARQ-ACK feedback in a slot or in a PUCCH according to the number of repetition transmissions of the PDSCH and the quantity of downlink transmissions with associated HARQ-ACK feedback in a slot or in a PUCCH, the process can be: according to a formula $$M = \left\lceil \frac{B}{A} \right\rceil,$$

calculating the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, $\lceil \; \rceil$ is a rounded up operator.

It should be noted that, in specific implementation, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Further, step 103 may include: mapping, by the terminal device, the HARQ-ACK feedback information corresponding to the PDSCH with repetition transmissions to the semi-static HARQ-ACK codebook according to the position of the PDSCH with repetition transmissions within the quantity of M PDSCHs with repetition transmission with associated HARQ-ACK feedback in the slot or in the PUCCH.

Optionally, the HARQ-ACK feedback information corresponding to the PDSCH with repetition transmissions is HARQ-ACK feedback information corresponding to the last transmission of the PDSCHs with repetition transmissions.

Figure 2:
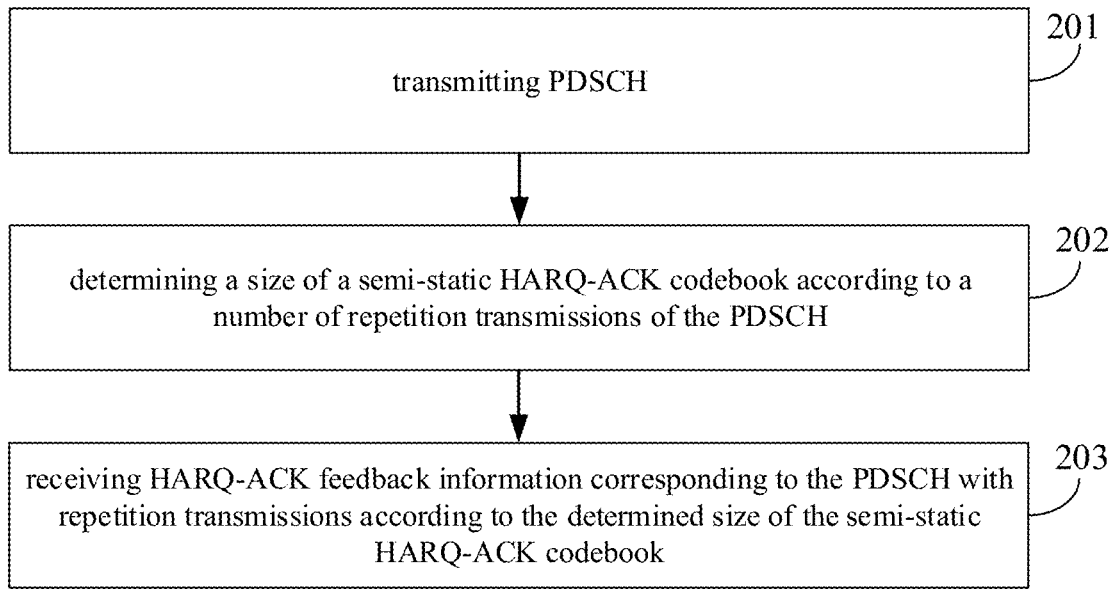
FIG. 2 is another schematic flowchart of a data transmission method according to an embodiment of the present disclosure.

As shown in FIG. 2, an embodiment of the present disclosure provides a data transmission method, which is applied to a network device, and includes the following steps:

Step 201: transmitting PDSCH;

Step 202: determining a size of a semi-static HARQ-ACK codebook according to a number of repetition transmissions of the PDSCH;

Step 203: receiving HARQ-ACK feedback information corresponding to the PDSCH with repetition transmissions according to the determined size of the semi-static HARQ-ACK codebook.

In the embodiment of the present disclosure, the size of the semi-static HARQ-ACK codebook is determined according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the HARQ-ACK feedback for normal repetition transmission of PDSCH, and further based on the semi-static HARQ-ACK codebook, the HARQ-ACK feedback information corresponding to the PDSCH with repetition transmissions, the reception performance of HARQ-ACK feedback information can be improved.

In the embodiment of the present disclosure, optionally, step 202 may include: determining the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; determining the size of the semi-static HARQ-ACK codebook according to the quantity of PDSCHs with repetition transmissions with associated HARQ-ACK feedback in a slot or in a PDCCH Optionally, the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

Optionally, the determining the quantity of PDSCHs with repetition transmissions with associated HARQ-ACK feedback in a slot or in a PUCCH according to the number of repetition transmissions of the PDSCH and the quantity of downlink transmissions with associated HARQ-ACK feedback in a slot or in a PUCCH includes: according to a formula $$M = \lceil \frac{B}{A} \rceil,$$

calculating the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, ⌈ ⌉ is a rounded up operator.

Optionally, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Further, step 203 may include: receiving the HARQ-ACK feedback information corresponding to the PDSCH with repetition transmissions in a corresponding position of the semi-static HARQ-ACK codebook according to the position of the PDSCH with repetition transmissions within the quantity of M PDSCHs with repetition transmission with associated HARQ-ACK feedback in the slot or in the PUCCH.

Optionally, the HARQ-ACK feedback information corresponding to the PDSCH with repetition transmissions is HARQ-ACK feedback information corresponding to the last transmission of the PDSCHs with repetition transmissions.

Figure 3:
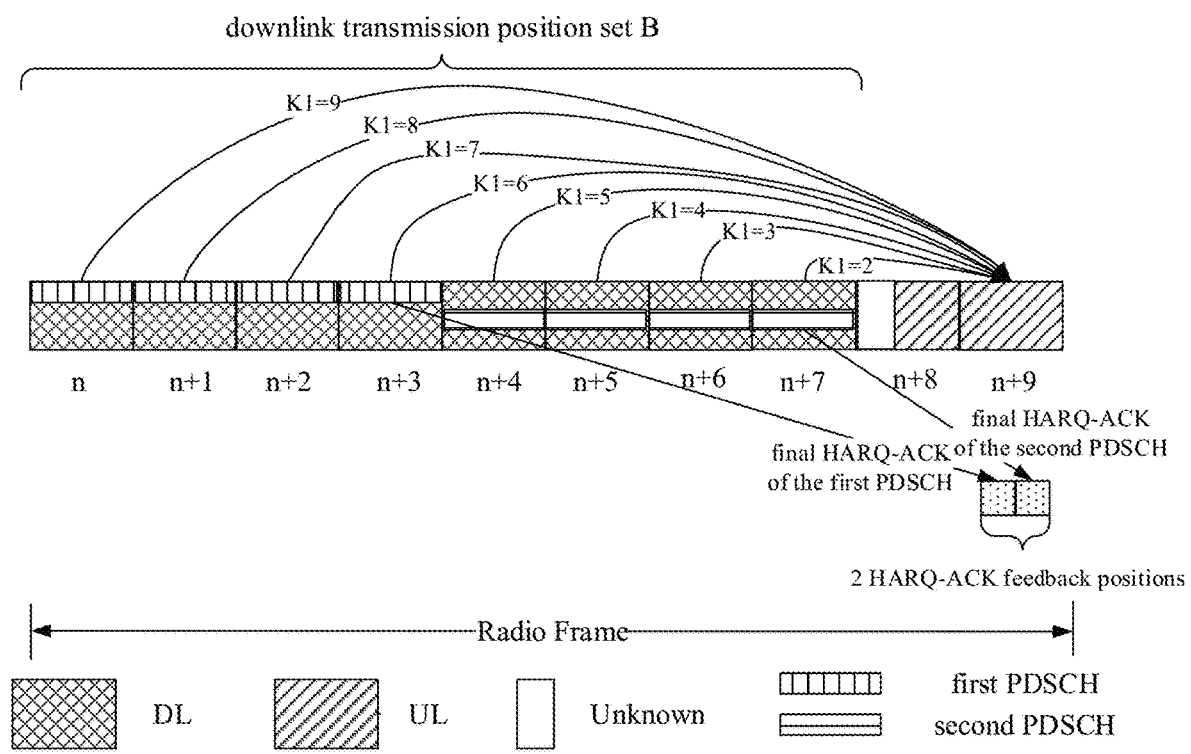
FIG. 3 is a schematic diagram of HARQ-ACK feedback in case 1 according to an embodiment of the disclosure.

Hereinafter, specific embodiments of the present disclosure will be described in detail with reference to FIGS. 3 to 5.

In the specific embodiment of the present disclosure, it is assumed that the candidate set K1 containing 8 HARQ-ACK timings is {2,3,4,5,6,7,8,9}, and the high-level signaling pre-configures the PDSCH for repetition transmission and the number of repetition transmission is A=4, that is, the PDSCH carrying the same TB needs to be retransmitted 4 times. If repetition transmission is performed in the unit of slot, each transmission is performed in a slot that contains enough DL or unknown symbols. The slot where the first PDSCH transmission is located can be determined according to the PDCCH scheduling, for example, determined according to K0. The time domain resources of PDSCH in a slot are determined according to the PDCCH scheduling, and during repetition transmission, the time domain position of each PDSCH in the transmission slot is the same. After the first slot, the repetition transmission is implemented in a slot which is allocated by the time domain source of the PDSCH. Currently, it is not excluded that repetition transmission can be performed inside the slot during specific implementation. For example, when the quantity of symbols allocated to a PDSCH is relatively small, in the specific embodiment of the present disclosure, the repetition transmission is implemented in the unit of slot.

Case 1: If the first transmission of the first PDSCH with repetition transmissions is in slot n, it is repeatedly transmitted in subsequent slots n+1, n+2, and n+3, and the first transmission of the second repeated PDSCH is in slot n+4, it is repeatedly transmitted in subsequent slots n+5, n+6, and n+7, the corresponding HARQ-ACK feedback process performed by the terminal device is as follows.

First, according to each K1 value in the set, 8 slots corresponding to HARQ-ACK transmission in slot n+9 can be determined, that is, slot n to slot n+7, and for each of these slots, the maximum quantity of PDSCHs that may exist in the slot is determined by the convention methods. For example, assume that the terminal capability only supports only one PDSCH in each slot, and each slot has a PDCCH monitoring timing in the slot for sending scheduling signaling determined according to K0, it is determined that each slot can contain a PDSCH transmission, that is, the quantity of downlink transmissions corresponding to HARQ-ACK feedback in slot n+9 on a carrier is B=8, or the quantity of slots containing downlink resources that can be scheduled is determined directly according to each K1, or a slot set range is determined according to the maximum and minimum values in the K1 set, and the quantity of slots containing downlink resources that can be scheduled in this set is determined as the quantity of downlink transmissions, B=8 can be obtained. Among them, the slot containing the downlink resources that can be scheduled is to determine whether the slot contains at least one downlink time domain resource in the preconfigured time domain resources allocation candidate set for a downlink transmission in each slot. If yes, it means that the slot contains enough downlink symbols that can be scheduled for PDSCH transmission; as shown in FIG. 3.

Second, according to the formula $$M = \left\lceil \frac{B}{A} \right\rceil = 2,$$

it can be determined that the 8 downlink transmission positions corresponding to HARQ-ACK feedback in slot n+9 can actually only contain up to 2 PDSCHs with 4 repetition transmissions; the reason is that for the PDSCHs with repetition transmissions, the terminal device determines the time domain position of HARQ-ACK feedback only for the last PDSCH and K1 value. Since the first several PDSCH repetition transmissions belong to the intermediate process of a repetition transmission of PDSCH, HARQ-ACK feedback is not required. Therefore, in this case, it can be determined that M=2, that is, the quantity of PDSCHs with repetition transmissions corresponding to HARQ-ACK feedback in slot n+9 is 2, there are only two downlink transmission positions for repetition transmission corresponding to HARQ-ACK feedback in slot n+9, and HARQ-ACK feedback is only required for these two downlink transmission positions, as shown in FIG. 3.

Then, according to the HARQ-ACK mapping principle, since the end position of the PDSCH received by the terminal device that ends the repetition transmission in slot n+3 is the fourth position among the B=8 positions, it belongs to the set of the first to the fourth positions determined by i=0, that is it belongs to the range where the first repetition transmission of PDSCH may exist in B downlink transmissions. Therefore, it can be determined that the first PDSCH with repetition transmissions is the first PDSCH with repetition transmissions among the two PDSCHs with repetition transmissions corresponding to the HARQ-ACK feedback in slot n+9. In the same way, since the end position of the PDSCH received by the terminal device that ends the repetition transmission in slot n+7 is the eighth position among the B=8 positions, it belongs to the set of the fifth to the eighth positions determined by i=1, that is it belongs to the range where the second repetition transmission of PDSCH may exist in B downlink transmissions. Therefore, it can be determined that the second PDSCH with repetition transmissions is the second PDSCH with repetition transmissions among the two PDSCHs with repetition transmissions corresponding to the HARQ-ACK feedback in slot n+9. In the specific embodiment of the present disclosure, assuming that the HARQ-ACK corresponding to each PDSCH with repetition transmissions is 1 bit, then the HARQ-ACK corresponding to each PDSCH with repetition transmissions corresponds to one HARQ-ACK feedback position. In 8 downlink transmissions, there are actually 2 HARQ-ACK feedback positions, and the first PDSCH with repetition transmissions corresponds to the first position among the two HARQ-ACK feedback positions, and the second PDSCH with repetition transmissions corresponds to the second position among the two HARQ-ACK feedback positions, as shown in FIG. 3.

Finally, the final HARQ-ACK feedback sequence is generated according to the above two HARQ-ACK positions, the HARQ-ACK feedback position corresponding to the first PDSCH with repetition transmissions, and the HARQ-ACK feedback position corresponding to the second PDSCH with repetition transmissions.

It should be pointed out that in the specific implementation, the HARQ-ACK corresponding to each PDSCH with repetition transmissions can be not only 1 bit, but also a plurality bits, depending on the specific configuration of the downlink transmission, such as single TB or multiple TBs, whether to implement spatial combination, whether to support CBG transmission, etc. When the HARQ-ACK corresponding to each PDSCH with repetition transmissions is a plurality of bits, such as 2 bits, when the first PDSCH with repetition transmissions is the first PDSCH with repetition transmissions among the two PDSCHs with repetition transmissions corresponding to the HARQ-ACK feedback in slot n+9 and the second PDSCH with repetition transmissions is the second PDSCH with repetition transmissions among the two PDSCHs with repetition transmissions corresponding to the HARQ-ACK feedback in slot n+9, in 8 downlink transmissions, there are only two PDSCHs with 4 repetition transmissions, so the HARQ-ACK feedback is implemented only for the two PDSCHs, and the quantity of HARQ-ACK feedback bits for each PDSCH is 2 bits, so the total quantity of HARQ-ACK feedback bits is 2×2=4 bits, which can be equivalent to 4 HARQ-ACK positions, then the first PDSCH with repetition transmissions corresponds to the first to second positions among the 4 HARQ-ACK feedback positions, the second PDSCH with repetition transmissions corresponds to the third to fourth positions among the 4 HARQ-ACK feedback positions, and the final HARQ-ACK feedback sequence is thus generated. Or it can also be understood that there are still 2 HARQ-ACK feedback positions, each HARQ-ACK feedback position corresponds to 2 bits of HARQ-ACK feedback information, that is, the 2 bits of HARQ-ACK of the first PDSCH with repetition transmissions is mapped to the 2 bits of HARQ-ACK feedback information corresponding to the first HARQ-ACK feedback position, the 2 bits of HARQ-ACK of the second PDSCH with repetition transmissions is mapped to the 2 bits of HARQ-ACK feedback information corresponding to the second HARQ-ACK feedback position, and the final HARQ-ACK feedback sequence is thus generated.

In this case, the network side, such as the base station, can determine the size of the semi-static HARQ-ACK codebook and the HARQ-ACK feedback position of repetition transmissions of different PDSCH in the same way, thereby obtaining HARQ-ACK feedback information corresponding to each PDSCH with repetition transmissions from the received HARQ-ACK feedback sequence.

Case 2: Only one repetition transmission of PDSCH is scheduled in B downlink transmission positions, the first transmission is implemented in slot n+1, and subsequent repetition transmissions are implemented in slots n+2, n+3, and n+4. The terminal equipment performs corresponding HARQ-ACK feedback process as follows.

First, B=8 and M=2 are determined in the same way as in case 1. When performing HARQ-ACK mapping, since the end position of the PDSCH received by the terminal device that ends repetition transmission in slot n+4 is the fifth position among B=8 positions, it belongs to the set of the 5th to 8th positions determined by i=1. Therefore, it can be determined that the first PDSCH with repetition transmissions is the second PDSCH among the two PDSCHs with repetition transmissions corresponding to the HARQ-ACK feedback in slot n+9. In the specific embodiment of the present disclosure, assuming that the HARQ-ACK corresponding to each PDSCH with repetition transmissions is 1 bit, then the HARQ-ACK corresponding to each PDSCH with repetition transmissions corresponds to one HARQ-ACK feedback position, among 8 downlink transmissions, there are actually 2 HARQ-ACK feedback positions. The first PDSCH with repetition transmissions corresponds to the second position of the 2 HARQ-ACK feedback positions, as shown in FIG. 4.

Figure 4:
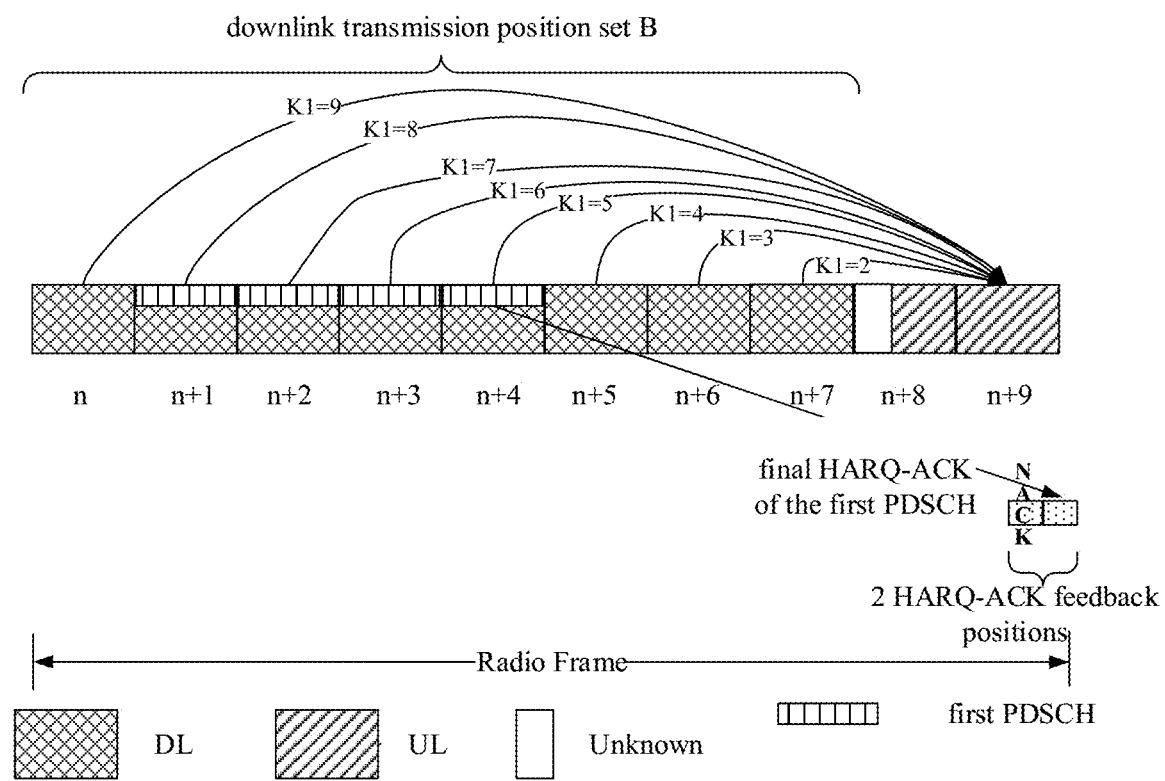
FIG. 4 is a schematic diagram of HARQ-ACK feedback in case 2 according to an embodiment of the disclosure.
Figure 5:
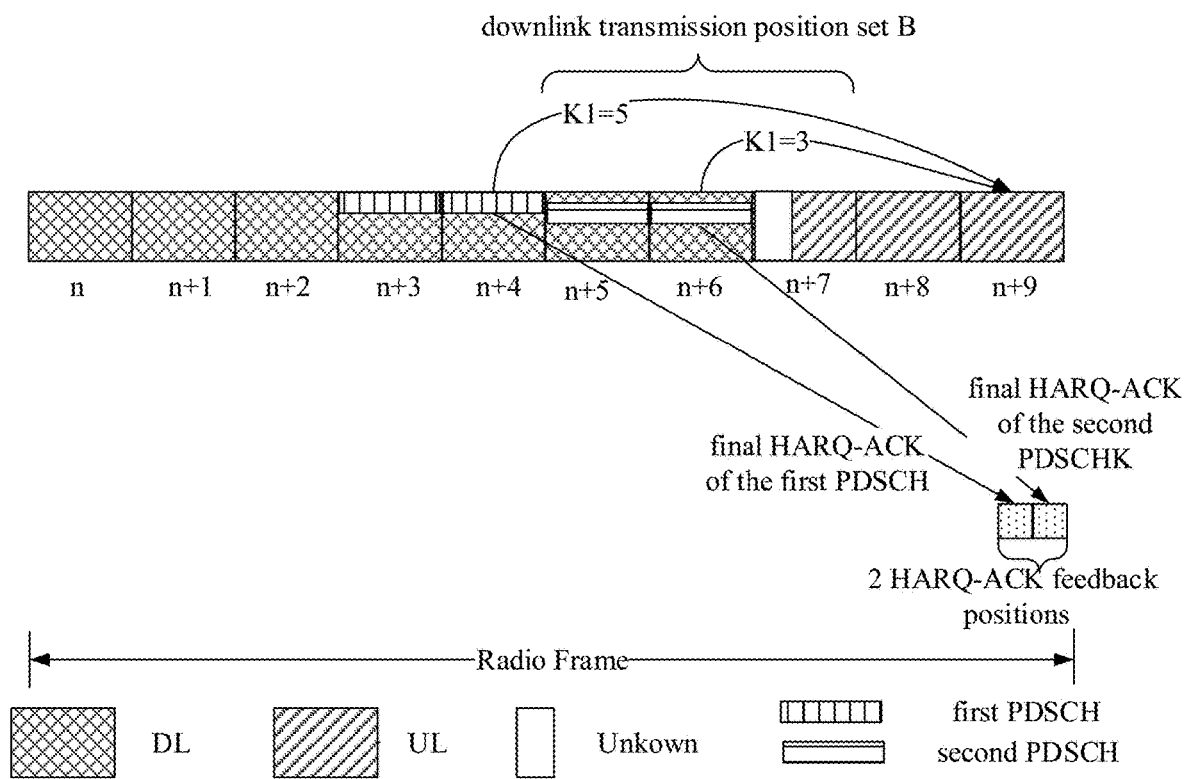
FIG. 5 is a schematic diagram of HARQ-ACK feedback according to an embodiment of the disclosure.

Then, according to the HARQ-ACK feedback position corresponding to the first PDSCH with repetition transmissions, the feedback information is mapped at the second HARQ-ACK feedback position, and the NACK information is mapped to the first HARQ-ACK feedback position, as shown in FIG. 4.

In this case, if there is a repetition transmission of PDSCH before the first PDSCH with repetition transmissions, and its starting position is not in the range of B=8 downlink transmission positions, but the last transmission is in slot n, then since the HARQ-ACK of the PDSCH is determined according to the position of the last PDSCH and K1, which also needs to be fed back in slot n+9. Therefore, the PDSCH that ends transmission in the set of positions 5 to 8 can only be mapped to the second HARQ-ACK feedback position, and the first HARQ-ACK feedback position is reserved for repetition transmission of PDSCH that may exist before. If the terminal device receives the last transmission of the repetition transmissions of PDSCH in slot n, it maps the HARQ-ACK feedback information corresponding to the PDSCH to the first HARQ-ACK feedback position, otherwise, NACK information is mapped to the first HARQ-ACK feedback position.

In this case, the network side, such as the base station, can determine the size of the semi-static HARQ-ACK codebook and the HARQ-ACK feedback position of repetition transmissions of different PDSCHs in the same way, thereby obtaining HARQ-ACK feedback information corresponding to each PDSCH with repetition transmissions from the received HARQ-ACK feedback sequence.

In another specific embodiment of the present disclosure, it is assumed that the candidate set K1 containing 3 HARQ-ACK timings is {1, 3, 5}. Of course, the set of K1 can have 8 values, but only 3 different values are included, and other values are repeated. For example, the set of K1 is {1,3,5,1,3,5,1,3}, which is to match the fixed 3-bit K1 indicator field, but even there are 8 values, and only 3 values are actually valid, namely {1,3,5}, and follow-up operations can be performed based on these 3 valid values. The high-level signaling pre-configures PDSCH for repetition transmission, and the number of repetition transmissions is A=2, that is, the PDSCH carrying the same TB needs to be repeatedly transmitted twice. If repetition transmission is performed in the unit of slot, each transmission is performed in a slot that contains enough DL or unknown symbols. The slot where the first PDSCH transmission is located can be determined according to the PDCCH scheduling, for example, based on K0. The time domain resources of the PDCCH in a slot are determined according to the PDCCH scheduling, and during repetition transmission, the time domain position of each PDSCH in the transmission slot is the same. After the first slot, the repetition transmission is implemented in a slot which is allocated by the time domain source of the PDSCH. Currently, it is not excluded that repetition transmission can be performed inside the slot during specific implementation. For example, when the quantity of symbols allocated to a PDSCH is relatively small, in the specific embodiment of the present disclosure, the repetition transmission is implemented in the unit of slot.

Among them, if the first transmission of the first PDSCH with repetition transmissions is in slot n+3, and the subsequent repetition transmission is in slot n+4, the first transmission of the second PDSCH with repetition transmissions is in slot n+5, and then the subsequent repetition transmissions is in slot n+6, the corresponding HARQ-ACK feedback process performed by the terminal device is as follows.

First, according to the maximum K1 value and the minimum K1 value in the set, a total of 5 slots from slot n+8 to slot n+4 can be determined corresponding to HARQ-ACK transmission in slot n+9, where slot n+8 and slot n+7 are the uplink slots, so the downlink transmission cannot be implemented in slot n+8 and slot n+7, and they are excluded from the semi-static HARQ-ACK codebook feedback. Only slot n+4 to slot n+6 are left. For each of these slots, the maximum quantity of PDSCHs that may exist in the slot is determined by the conventional method. For example, assume that the terminal capability only supports only one PDSCH in each slot, and each slot has a PDCCH monitoring timing in the slot for sending scheduling signaling determined according to K0, it is determined that each slot can contain one PDSCH transmission, that is, the quantity of downlink transmissions corresponding to HARQ-ACK feedback in slot n+9 on a carrier is B=3, or the quantity of slots containing downlink resources that can be scheduled is determined directly according to each K1, or a slot set range is determined according to the maximum and minimum values in the K1 set, and the quantity of slots containing downlink resources that can be scheduled in this set is determined as the quantity of downlink transmissions, B=3 can be obtained. Among them, the slot containing the downlink resources that can be scheduled is to determine whether the slot contains at least one downlink time domain resource in the preconfigured time domain resources allocation candidate set for a downlink transmission in each slot. If yes, it means that the slot contains enough downlink symbols that can be scheduled for PDSCH transmission; as shown in FIG. 5.

Second, according to the formula $$M = \left\lceil \frac{B}{A} \right\rceil = 2,$$

it can be determined that the 3 downlink transmission positions corresponding to HARQ-ACK feedback in slot n+9 can actually only contain up to 2 PDSCHs with 2 repetition transmissions; the reason is that for the PDSCHs with repetition transmissions, the terminal device determines the time domain position of HARQ-ACK feedback only for the last PDSCH and K1 value. Since the first several PDSCH repetition transmissions belong to the intermediate process of a repetition transmission of PDSCH, HARQ-ACK feedback is not required. Therefore, in this case, it can be determined that M=2, that is, the quantity of PDSCHs with repetition transmissions corresponding to HARQ-ACK feedback in slot n+9 is 2, there are only two downlink transmission positions for repetition transmission corresponding to HARQ-ACK feedback in slot n+9, and HARQ-ACK feedback is only required for these two downlink transmission positions, as shown in FIG. 5.

Then, according to the HARQ-ACK mapping principle, since the end position of the PDSCH received by the terminal device that ends the repetition transmission in slot n+3 is the fourth position among the B=3 positions, it belongs to the set of the first to the second positions determined by i=0, that is it belongs to the range where the first repetition transmission of PDSCH may exist in B downlink transmissions. Therefore, it can be determined that the first PDSCH with repetition transmissions is the first PDSCH with repetition transmissions among the two PDSCHs with repetition transmissions corresponding to the HARQ-ACK feedback in slot n+9. In the same way, since the end position of the PDSCH received by the terminal device that ends the repetition transmission in slot n+6 is the fourth position among the B=3 positions, it belongs to the set of the third to the fourth positions determined by i=1, that is it belongs to the range where the second repetition transmission of PDSCH may exist in B downlink transmissions. Therefore, it can be determined that the second PDSCH with repetition transmissions is the second PDSCH with repetition transmissions among the two PDSCHs with repetition transmissions corresponding to the HARQ-ACK feedback in slot n+9. In the specific embodiment of the present disclosure, assuming that the HARQ-ACK corresponding to each PDSCH with repetition transmissions is 1 bit, then the HARQ-ACK corresponding to each PDSCH with repetition transmissions corresponds to one HARQ-ACK feedback position. In 3 downlink transmissions, there are actually 2 HARQ-ACK feedback positions, and the first PDSCH with repetition transmissions corresponds to the first position among the two HARQ-ACK feedback positions, and the second PDSCH with repetition transmissions corresponds to the second position among the two HARQ-ACK feedback positions, as shown in FIG. 5.

Finally, the final HARQ-ACK feedback sequence is generated according to the above two HARQ-ACK positions, the HARQ-ACK feedback position corresponding to the first PDSCH with repetition transmissions, and the HARQ-ACK feedback position corresponding to the second PDSCH with repetition transmissions.

It should be pointed out that in the specific implementation, the HARQ-ACK corresponding to each PDSCH with repetition transmissions can be not only 1 bit, but also a plurality bits, depending on the specific configuration of the downlink transmission, such as single TB or multiple TBs, whether to implement spatial combination, whether to support CBG transmission, etc. When the HARQ-ACK corresponding to each PDSCH with repetition transmissions is a plurality of bits, such as 2 bits, when the first PDSCH with repetition transmissions is the first PDSCH with repetition transmissions among the two PDSCHs with repetition transmissions corresponding to the HARQ-ACK feedback in slot n+9 and the second PDSCH with repetition transmissions is the second PDSCH with repetition transmissions among the two PDSCHs with repetition transmissions corresponding to the HARQ-ACK feedback in slot n+9, in 8 downlink transmissions, there are only two PDSCHs with 2 repetition transmissions, so the HARQ-ACK feedback is implemented only for the two PDSCHs, and the quantity of HARQ-ACK feedback bits for each PDSCH is 2 bits, so the total quantity of HARQ-ACK feedback bits is 2×2=4 bits, which can be equivalent to 4 HARQ-ACK positions, then the first PDSCH with repetition transmissions corresponds to the first to second positions among the 4 HARQ-ACK feedback positions, the second PDSCH with repetition transmissions corresponds to the third to fourth positions among the 4 HARQ-ACK feedback positions, and the final HARQ-ACK feedback sequence is thus generated. Or it can also be understood that there are still 2 HARQ-ACK feedback positions, each HARQ-ACK feedback position corresponds to 2 bits of HARQ-ACK feedback information, that is, the 2 bits of HARQ-ACK of the first PDSCH with repetition transmissions is mapped to the 2 bits of HARQ-ACK feedback information corresponding to the first HARQ-ACK feedback position, the 2 bits of HARQ-ACK of the second PDSCH with repetition transmissions is mapped to the 2 bits of HARQ-ACK feedback information corresponding to the second HARQ-ACK feedback position, and the final HARQ-ACK feedback sequence is thus generated.

In this case, the network side, such as the base station, can determine the size of the semi-static HARQ-ACK codebook and the HARQ-ACK feedback position of repetition transmissions of different PDSCH in the same way, thereby obtaining HARQ-ACK feedback information corresponding to each PDSCH with repetition transmissions from the received HARQ-ACK feedback sequence.

The above embodiments describe the data transmission method of the present disclosure, and the terminal device and network device of the present disclosure will be described below in conjunction with the embodiments and the drawings.

Figure 6:
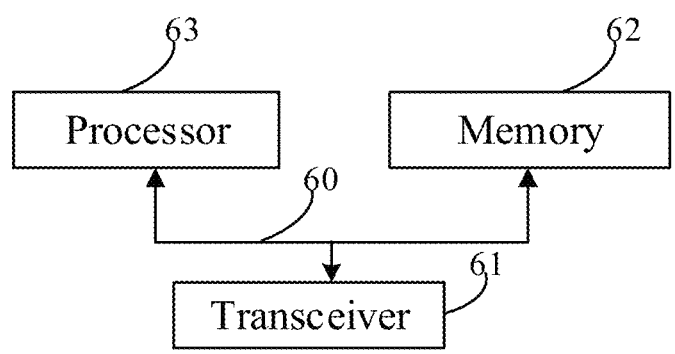
FIG. 6 is a schematic structural diagrams of the terminal device according to an embodiment of the disclosure.

As shown in FIG. 6, an embodiment of the present disclosure also provides a terminal device, including a transceiver 61, a memory 62, a processor 63, and a computer program stored on the memory 62 and executed by the processor 63.

The transceiver 61 is used to receive PDSCH.

The processor 63 is configured to determine a size of a semi-static HARQ-ACK codebook according to a number of repetition transmissions of the PDSCH; and perform a corresponding HARQ-ACK feedback for the PDSCH with repetition transmissions according to the determined size of the semi-static HARQ-ACK codebook.

The terminal device of the embodiment of the present disclosure determines the size of the semi-static HARQ-ACK codebook according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the normal HARQ-ACK feedback of the PDSCH with repetition transmissions, and further based on the semi-static HARQ-ACK codebook, when corresponding HARQ-ACK feedback is implemented for the PDSCH with repetition transmissions, the transmission performance of HARQ-ACK feedback information can be improved.

In the embodiment of the present disclosure, optionally, the processor 63 is further configured to: determine the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; determine the size of the semi-static HARQ-ACK codebook according to the quantity of PDSCHs with repetition transmissions with associated HARQ-ACK feedback in a slot or in a PDCCH Optionally, the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

Optionally, the processor 63 is further configured to: according to a formula $$M = \left\lceil \frac{B}{A} \right\rceil,$$

calculate the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, ⌈ ⌉ is a rounded up operator.

Optionally, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Optionally, the transceiver 61 is also configured to: map the HARQ-ACK feedback information corresponding to the PDSCH with repetition transmissions to the semi-static HARQ-ACK code according to the position of the PDSCH with repetition transmissions for the HARQ-ACK feedback in a slot or in a PDCCH Optionally, the HARQ-ACK feedback information corresponding to the PDSCH with repetition transmissions is HARQ-ACK feedback information corresponding to the last transmission of the PDSCH with repetition transmissions.

In FIG. 6, the bus architecture (represented by the bus 60) can include any quantity of interconnected buses and bridges. The bus 60 will connect the circuits including one or more processors represented by the processor 63 and various types of memory represented by the memory 62. The transceiver 61 may include a transmitter and a receiver, and the transmitter and the receiver may be connected to the processor 63 and the memory 62 through the bus 60.

The processor 63 is responsible for managing the bus 60 and general processing, and the memory 62 can be used to store data used by the processor 62 when performing operations.

Figure 7:
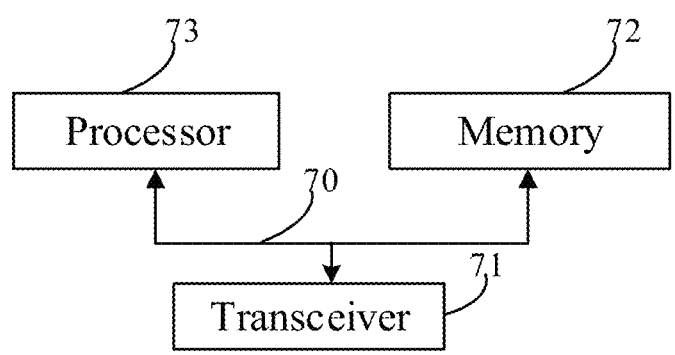
FIG. 7 is a schematic structural diagrams of the network device of the embodiment of the disclosure.

As shown in FIG. 7, an embodiment of the present disclosure also provides a network device, including a transceiver 71, a memory 72, a processor 73, and a computer program stored on the memory 72 and executed by the processor 73.

The transceiver 71 is configured to: transmit PDSCH.

The processor 73 is configured to determine a size of a semi-static HARQ-ACK codebook according to a number of repetition transmissions of the PDSCH.

The transceiver 71 is further configured to receive HARQ-ACK feedback information corresponding to the PDSCH with repetition transmissions according to the determined size of the semi-static HARQ-ACK codebook.

The network device of the embodiment of the present disclosure determines the size of the semi-static HARQ-ACK codebook according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the HARQ-ACK feedback for normal repetition transmission of PDSCH, and further based on the semi-static HARQ-ACK codebook, the HARQ-ACK feedback information corresponding to the PDSCH with repetition transmissions, the reception performance of HARQ-ACK feedback information can be improved.

In the embodiment of the present disclosure, optionally, the processor 73 is further configured to: determine the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; determine the size of the semi-static HARQ-ACK codebook according to the quantity of PDSCHs with repetition transmissions with associated HARQ-ACK feedback in a slot or in a PDCCH Optionally, the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

Optionally, the processor 73 is further configured to: according to a formula $$M = \left\lceil \frac{B}{A} \right\rceil,$$

calculate the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, ⌈ ⌉ is a rounded up operator.

Optionally, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Optionally, the transceiver 71 is configured to: receive the HARQ-ACK feedback information corresponding to the PDSCH with repetition transmissions in a corresponding position of the semi-static HARQ-ACK codebook according to the position of the PDSCH with repetition transmissions within the quantity of M PDSCHs with repetition transmission with associated HARQ-ACK feedback in the slot or in the PUCCH.

Optionally, the HARQ-ACK feedback information corresponding to the PDSCH with repetition transmissions is HARQ-ACK feedback information corresponding to the last transmission of the PDSCH with repetition transmissions.

In FIG. 7, the bus architecture (represented by the bus 70) can include any quantity of interconnected buses and bridges. The bus 70 will connect the circuits including one or more processors represented by the processor 73 and various memories represented by the memory 72. The transceiver 71 may include a transmitter and a receiver, and the transmitter and the receiver may be connected to the processor 73 and the memory 72 through the bus 70.

The processor 73 is responsible for managing the bus 70 and general processing, and the memory 72 can be used to store data used by the processor 72 when performing operations.

Figure 8:
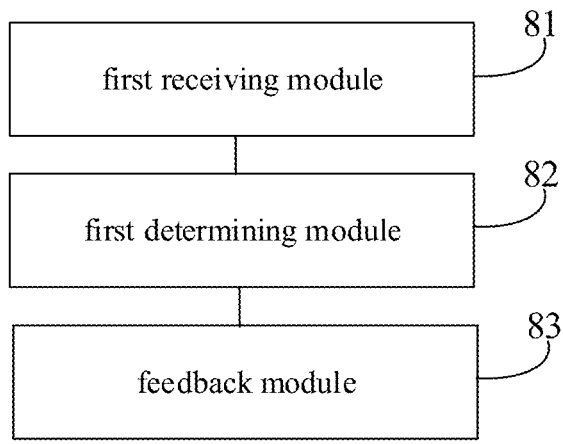
FIG. 8 is a schematic structural diagrams of the data transmission device according to an embodiment of the disclosure.

As shown in FIG. 8, an embodiment of the present disclosure also provides a data transmission device, which is applied to terminal device, and includes: a first receiving module 81, configured to receive PDSCH; a first determining module 82, configured to determine a size of a semi-static HARQ-ACK codebook according to a number of repetition transmissions of the PDSCH; and a feedback module 83, configured to perform a corresponding HARQ-ACK feedback for the PDSCH with repetition transmissions according to the determined size of the semi-static HARQ-ACK codebook.

The data transmission device of the embodiment of the present disclosure determines the size of the semi-static HARQ-ACK codebook according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the normal HARQ-ACK feedback of the PDSCH with repetition transmissions, and further based on the semi-static HARQ-ACK codebook, when corresponding HARQ-ACK feedback is implemented for the PDSCH with repetition transmissions, the transmission performance of HARQ-ACK feedback information can be improved.

In the embodiment of the present disclosure, optionally, the first determining module 82 includes: a first determining unit, configured to determine the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; and a second determining unit, configured to determine the size of the semi-static HARQ-ACK codebook according to the quantity of PDSCHs with repetition transmissions with associated HARQ-ACK feedback in a slot or in a PDCCH Optionally, the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

Optionally, the first determining unit is specifically configured to: according to a formula $$M = \left\lceil \frac{B}{A} \right\rceil,$$

calculate the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, ⌈ ⌉ is a rounded up operator.

Optionally, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Optionally, the feedback module 83 is specifically configured to: map the HARQ-ACK feedback information corresponding to the PDSCH with repetition transmissions to the semi-static HARQ-ACK code according to the position of the PDSCH with repetition transmissions for the HARQ-ACK feedback in a slot or in a PDCCH Optionally, the HARQ-ACK feedback information corresponding to the PDSCH with repetition transmissions is HARQ-ACK feedback information corresponding to the last transmission of the PDSCH with repetition transmissions.

Figure 9:
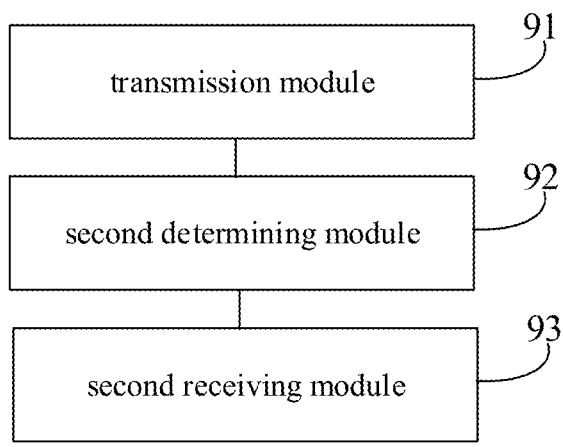
FIG. 9 is another schematic structural diagram of the data transmission device according to an embodiment of the disclosure.

As shown in FIG. 9, an embodiment of the present disclosure also provides a data transmission device applied to the network equipment, including: a transmission module 91 is used to transmit PDSCH; a second determining module 92, configured to determine a size of a semi-static HARQ-ACK codebook according to a number of repetition transmissions of the PDSCH; and a second receiving module 93, configured to receive HARQ-ACK feedback information corresponding to the PDSCH with repetition transmissions according to the determined size of the semi-static HARQ-ACK codebook.

The data transmission device of the embodiment of the present disclosure determines the size of the semi-static HARQ-ACK codebook according to the number of repetition transmissions of the PDSCH. As compared to the semi-static HARQ-ACK codebook determined according to the quantity of downlink transmissions with associated HARQ-ACK feedback in one slot, the redundant information in the semi-static HARQ-ACK codebook is reduced on the basis of ensuring the HARQ-ACK feedback for normal repetition transmission of PDSCH, and further based on the semi-static HARQ-ACK codebook, the HARQ-ACK feedback information corresponding to the PDSCH with repetition transmissions, the reception performance of HARQ-ACK feedback information can be improved.

In the embodiment of the present disclosure, optionally, the second determining module 92 includes: a third determining unit, configured to determine the quantity of PDSCHs with repetition transmissions with associated HARQ-ACK feedback in a slot or in a PUCCH according to the number of repetition transmissions of PDSCH and the quantity of downlink transmissions with associated HARQ-ACK feedback in the slot or in the PUCCH; and a fourth determining unit, configured to determine the size of the semi-static HARQ-ACK codebook according to the quantity of PDSCHs with repetition transmissions with associated HARQ-ACK feedback in a slot or in a PDCCH Optionally, the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to the range of slot determined by the maximum value and the minimum value in a feedback timing set for the timing between the PDSCH and a corresponding HARQ-ACK and the time domain resource allocation candidate set for a downlink transmission in each slot.

Optionally, the third determining unit is specifically configured to: according to a formula $$M = \left\lceil \frac{B}{A} \right\rceil,$$

calculate the quantity of PDSCHs with repetition transmissions with associated HARQ-ACK feedback in a slot or in a PDCCH M is the quantity of PDSCHs with repetition transmissions with associated HARQ-ACK feedback in a slot or in a PUCCH, B is the quantity of downlink transmissions with associated HARQ-ACK feedback in a slot or in a PUCCH, and A is the number of repetition transmissions of PDSCHs, $\lceil \ \rceil$ is a rounded up operator.

Optionally, if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

Optionally, the second receiving module 93 is specifically configured to: receive the HARQ-ACK feedback information corresponding to the PDSCH with repetition transmissions in a corresponding position of the semi-static HARQ-ACK codebook according to the position of the PDSCH with repetition transmissions within the quantity of M PDSCHs with repetition transmission with associated HARQ-ACK feedback in the slot or in the PUCCH.

Optionally, the HARQ-ACK feedback information corresponding to the PDSCH with repetition transmissions is HARQ-ACK feedback information corresponding to the last transmission of the PDSCH with repetition transmissions.

In addition, the embodiments of the present disclosure also provide a terminal device, including a processor, a memory, and a computer program stored on the memory and executed by the processor, wherein the computer program is executed by the processor to implement each process of the above-mentioned data transmission method embodiment applied to a terminal device, and the same technical effect can be achieved. In order to avoid repetition, it will not be repeated here.

Figure 10:
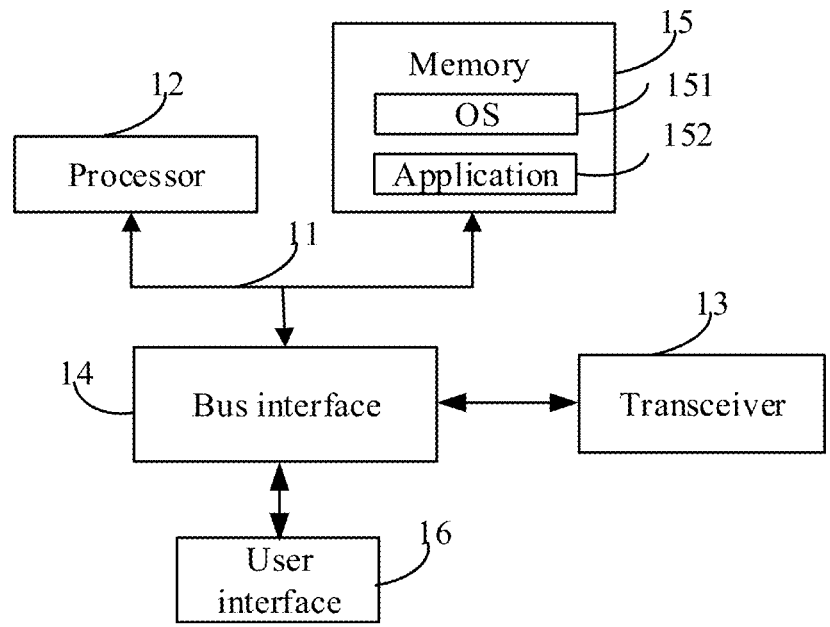
FIG. 10 is another schematic structural diagram of a terminal device according to an embodiment of the disclosure.

Specifically, referring to FIG. 10, an embodiment of the present disclosure also provides a terminal device, including a bus 11, a processor 12, a transceiver 13, a bus interface 14, a memory 15, and a user interface 16.

Wherein, the processor 12 is configured to read the program in the memory 15 and execute the following steps: controlling the transceiver 13 to receive PDSCH, determining a size of a semi-static HARQ-ACK codebook according to a number of repetition transmissions of the PDSCH, and performing a corresponding HARQ-ACK feedback for the PDSCH with repetition transmissions according to the determined size of the semi-static HARQ-ACK codebook.

The transceiver 13 is used to receive and send data under the control of the processor 12.

In FIG. 10, the bus architecture (represented by bus 11) can include any quantity of interconnected buses and bridges. The bus 11 will connect the circuits including one or more processors represented by the general-purpose processor 12 and a memory represented by the memory 15. The bus 11 may also connect various other circuits such as peripheral devices, voltage regulators, power management circuits, etc., which are all known in the art, and therefore, no further descriptions are provided herein. The bus interface 14 provides an interface between the bus 11 and the transceiver 13. The transceiver 13 may be one element or multiple elements, such as multiple receivers and transmitters, providing a unit for communicating with various other devices on the transmission medium. For example, the transceiver 13 receives external data from other devices. The transceiver 13 is used to send the data processed by the processor 12 to other devices. Depending on the nature of the computing system, a user interface 16 may also be provided, such as a keypad, a display, a speaker, a microphone, a joystick.

The processor 12 is responsible for managing the bus 11 and general processing, and runs a general operating system as described above. The memory 15 may be used to store data used by the processor 12 when performing operations.

Optionally, the processor 12 may be a CPU, ASIC, FPGA or CPLD.

It can be understood that the memory 15 in the embodiment of the present disclosure may be a volatile memory or a non-volatile memory, or may include both volatile and non-volatile memory. Among them, the non-volatile memory can be read-only memory (ROM), programmable read-only memory (PROM), erasable programmable read-only memory (EPROM), and electrically available Erase programmable read-only memory (EEPROM) or flash memory. The volatile memory may be a random access memory (RAM), which is used as an external cache. By way of exemplary but not restrictive description, many forms of RAM are available, such as static random access memory (SRAM), dynamic random access memory (DRAM), synchronous dynamic random access memory (SDRAM), Double Data rate SDRAM (DDRSDRAM), Enhanced Synchronous Dynamic Random Access Memory (ESDRAM), Synchronous Link Dynamic Random Access Memory (SLDRAM) and Direct Rambus RAM (DRRAM). The memory 15 of the system and method described in the embodiments of the present disclosure is intended to include but not limited to these and any other suitable types of memory In some embodiments, the memory 15 stores the following elements, executable modules or data structures, or a subset thereof, or an extended set thereof: an operating system 151 and an application program 152.

The operating system 151 includes various system programs, such as a framework layer, a core library layer, a driver layer, etc., for implementing various basic services and processing hardware-based tasks. The application program 152 includes various application programs, such as a media player (Media Player), a browser (Browser), etc., for implementing various application services. A program that implements the method of the embodiments of the present disclosure may be included in the application program 152.

The embodiment of the present disclosure also provides a network device, including a processor, a memory, and a computer program stored on the memory and executed by the processor, wherein the computer program is executed by the processor to implement each process of the above-mentioned data transmission method embodiment applied to a network device, the same technical effect can be achieved. In order to avoid repetition, it will not be repeated herein.

Figure 11:
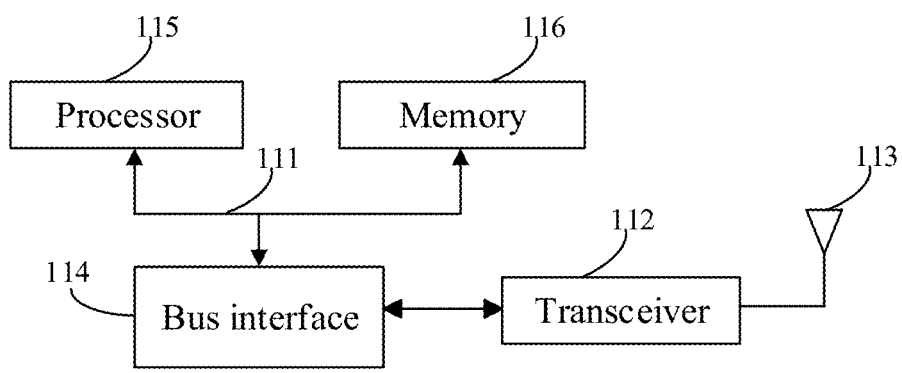
FIG. 11 is another schematic structural diagram of a network device according to an embodiment of the disclosure.

Specifically, referring to FIG. 11, an embodiment of the present disclosure also provides a network device, including a bus 111, a transceiver 112, an antenna 113, a bus interface 114, a processor 115, and a memory 116.

In the embodiment of the present disclosure, the network device further includes: a computer program stored on the memory 116 and executed by the processor 115, and the computer program is executed by the processor 115 to implement the following steps: controlling the transceiver 112 to transmit PDSCH, determining a size of a semi-static HARQ-ACK codebook according to a number of repetition transmissions of the PDSCH; and receiving HARQ-ACK feedback information corresponding to the PDSCH with repetition transmissions according to the determined size of the semi-static HARQ-ACK codebook.

The transceiver 112 is used to receive and send data under the control of the processor 115.

In FIG. 11, the bus architecture (represented by bus 111) can include any quantity of interconnected buses and bridges. The bus 111 will connect the circuits including one or more processors represented by the general-purpose processor 112 and a memory represented by the memory 115. The bus 111 may also connect various other circuits such as peripheral devices, voltage regulators, power management circuits, etc., which are all known in the art, and therefore, no further descriptions are provided herein. The bus interface 114 provides an interface between the bus 111 and the transceiver 113. The transceiver 113 may be one element or multiple elements, such as multiple receivers and transmitters, providing a unit for communicating with various other devices on the transmission medium. The data processed by the processor 115 is transmitted on the wireless medium through the antenna 113, and further, the antenna 113 also receives the data and transmits the data to the processor 115.

The processor 115 is responsible for managing the bus 111 and general processing, and can also provide various functions, including timing, peripheral interfaces, voltage regulation, power management, and other control functions. The memory 116 may be used to store data used by the processor 115 when performing operations.

Optionally, the processor 115 may be a CPU, ASIC, FPGA or CPLD.

The embodiments of the present disclosure also provide a computer-readable storage medium on which a computer program is stored. When the program is executed by a processor, each process of the above-mentioned data transmission method embodiment applied to a terminal device is realized, and the same technical effects are achieved. In order to avoid repetition, it will not repeated herein.

The embodiments of the present disclosure also provide a computer-readable storage medium on which a computer program is stored. When the program is executed by a processor, each process of the above-mentioned data transmission method embodiment applied to a network device is realized, and the same technical effects are achieved. In order to avoid repetition, it will not repeated herein.

The computer-readable storage medium includes permanent, non-permanent, removable and non-removable medium, and information storage can be realized by any method or technology. The information can be computer-readable instructions, data structures, program modules, or other data. Examples of computer readable storage medium includes, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory, CD-ROM, digital versatile disc (DVD) or other optical storage, Magnetic cassettes, magnetic tape magnetic disk storage or other magnetic storage devices or any other non-transmission media can be used to store information that can be accessed by computing devices. According to the present disclosure, computer-readable media does not include transitory media, such as modulated data signals and carrier waves.

It should be noted that in this disclosure, the terms "include", "comprise" or any other variants thereof are intended to cover non-exclusive inclusion, so that a process, method, article or device including a series of elements not only includes those elements, but also includes other elements not explicitly listed, or elements inherent to the process, method, article, or device. If there are no more restrictions, the element defined by the sentence "including a . . . " does not exclude the existence of other identical elements in the process, method, article or device that includes the element.

Through the description of the above embodiments, those skilled in the art can clearly understand that the method of the above embodiments can be implemented by means of software plus the necessary general hardware platform. Of course, it can also be implemented by hardware, but in many cases the former is better. Based on this understanding, the technical solution of the present disclosure essentially or the part that contributes to the prior art can be embodied in the form of a software product, and the computer software product is stored in a storage medium (such as ROM/RAM, magnetic disk, the optical disc) includes a quantity of instructions to enable a terminal device (which may be a mobile phone, a computer, a server, an air conditioner, or a network device, etc.) to execute the method described in each embodiment of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method applied to a terminal device, comprising:
   receiving Physical Downlink Shared Channel (PDSCH);
   determining a size of a semi-static Hybrid Automatic Repeat Request-Acknowledge (HARQ-ACK) codebook according to a number of repetition transmissions of the PDSCH; and
   performing a corresponding HARQ-ACK feedback for the PDSCH with repetition transmissions according to the determined size of the semi-static HARQ-ACK codebook,
   wherein determining a size of a semi-static Hybrid Automatic Repeat Request-Acknowledge (HARQ-ACK) codebook according to a number of repetition transmissions of the PDSCH comprises:
   determining a quantity of PDSCHs with repetition transmissions with associated HARQ-ACK feedback in a slot or in a Physical Uplink Control Channel (PUCCH) according to the number of repetition transmissions of the PDSCH and a quantity of downlink transmissions with associated HARQ-ACK feedback in the slot or in the PUCCH; and
   determining the size of the semi-static HARQ-ACK codebook according to the quantity of PDSCHs with repetition transmissions with associated HARQ-ACK feedback in the slot or in the PUCCH.

2. The method according to claim 1, wherein the quantity of downlink transmissions with associated HARQ-ACK feedback in a slot or in a PUCCH may be at least one of:
   the quantity of downlink transmissions determined according to each value in a feedback timing set for the timing between the PDSCH and a corresponding HARQ-ACK;
   the quantity of downlink transmissions determined according to a range of slot determined by a maximum value and a minimum value in a feedback timing set for the timing between the PDSCH and a corresponding HARQ-ACK;
   the quantity of downlink transmissions determined according to each value in a feedback timing set for the timing between the PDSCH and a corresponding HARQ-ACK and a time domain resource allocation candidate set for a downlink transmission in each slot;
   the quantity of downlink transmissions determined according to a range of slot determined by a maximum value and a minimum value in a feedback timing set for the timing between the PDSCH and a corresponding HARQ-ACK and a time domain resource allocation candidate set for a downlink transmission in each slot.

3. The method according to claim 2, wherein determining the quantity of PDSCHs with repetition transmissions with associated HARQ-ACK feedback in a slot or in a Physical Uplink Control Channel (PUCCH) according to the number of repetition transmissions of the PDSCH and a quantity of downlink transmissions with associated HARQ-ACK feedback in the slot or in the PUCCH comprises:
   calculating the quantity of PDSCHs with repetition transmissions with associated HARQ-ACK feedback in the slot or in the PUCCH according to a formula $$M = \left\lceil \frac{B}{A} \right\rceil,$$

wherein M is the quantity of PDSCHs with repetition transmissions with associated HARQ-ACK feedback in the slot or in the PUCCH, B is the quantity of downlink transmissions with associated HARQ-ACK feedback in the slot or in the PUCCH, and A is the number of repetition transmissions of PDSCHs, $\lceil \rceil$ is a rounded up operator; and/or
   wherein performing a corresponding HARQ-ACK feedback for the PDSCH with repetition transmissions according to the determined size of the semi-static HARQ-ACK codebook comprises:
   mapping HARQ-ACK feedback information corresponding to the PDSCH with repetition transmissions to the semi-static HARQ-ACK codebook according to the position of the PDSCH with repetition transmissions within the quantity of M PDSCHs with repetition transmission with associated HARQ-ACK feedback in the slot or in the PUCCH.

4. The method according to claim 3, wherein if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

5. The method according to claim 1, wherein the HARQ-ACK feedback information corresponding to the PDSCH with repetition transmissions is HARQ-ACK feedback information corresponding to the last transmission of the PDSCH with repetition transmissions.

6. A data transmission method applied to a network device, comprising:
   transmitting PDSCH;
   determining a size of a semi-static HARQ-ACK codebook according to a number of repetition transmissions of the PDSCH;
   receiving HARQ-ACK feedback information corresponding to the PDSCH with repetition transmissions according to the determined size of the semi-static HARQ-ACK codebook,
   wherein determining a size of a semi-static HARQ-ACK codebook according to a number of repetition transmissions of the PDSCH comprises:
   determining a quantity of PDSCHs with repetition transmissions with associated HARQ-ACK feedback in a slot or in a PUCCH according to the number of repetition transmissions of the PDSCH and a quantity of downlink transmissions with associated HARQ-ACK feedback in the slot or in the PUCCH; and
   determining the size of the semi-static HARQ-ACK codebook according to the quantity of PDSCHs with repetition transmissions with associated HARQ-ACK feedback in the slot or in the PUCCH.

7. The method according to claim 6, wherein
the quantity of downlink transmissions with associated HARQ-ACK feedback in a slot or in a PUCCH may be at least one of:
the quantity of downlink transmissions determined according to each value in a feedback timing set for the timing between the PDSCH and a corresponding HARQ-ACK;
the quantity of downlink transmissions determined according to a range of slot determined by a maximum value and a minimum value in a feedback timing set for the timing between the PDSCH and a corresponding HARQ-ACK;
the quantity of downlink transmissions determined according to each value in a feedback timing set for the timing between the PDSCH and a corresponding HARQ-ACK and a time domain resource allocation candidate set for a downlink transmission in each slot;
the quantity of downlink transmissions determined according to a range of slot determined by a maximum value and a minimum value in a feedback timing set for the timing between the PDSCH and a corresponding HARQ-ACK and a time domain resource allocation candidate set for a downlink transmission in each slot.

8. The method according to claim 7, wherein determining the quantity of PDSCHs with repetition transmissions with associated HARQ-ACK feedback in a slot or in a Physical Uplink Control Channel (PUCCH) according to the number of repetition transmissions of the PDSCH and a quantity of downlink transmissions with associated HARQ-ACK feedback in the slot or in the PUCCH comprises:
calculating the quantity of PDSCHs with repetition transmissions with associated HARQ-ACK feedback in the slot or in the PUCCH according to a formula $$M = \left\lceil \frac{B}{A} \right\rceil,$$

wherein M is the quantity of PDSCHs with repetition transmissions with associated HARQ-ACK feedback in the slot or in the PUCCH, B is the quantity of downlink transmissions with associated HARQ-ACK feedback in the slot or in the PUCCH, and A is the number of repetition transmissions of PDSCHs, $\lceil \, \rceil$ is a rounded up operator; and/or
wherein receiving HARQ-ACK feedback information corresponding to the PDSCH with repetition transmissions according to the determined size of the semi-static HARQ-ACK codebook comprises:
receiving HARQ-ACK feedback information corresponding to the PDSCH with repetition transmissions in a corresponding position of the semi-static HARQ-ACK codebook according to the position of the PDSCH with repetition transmissions within the quantity of M PDSCHs with repetition transmission with associated HARQ-ACK feedback in the slot or in the PUCCH.

9. The method according to claim 8, wherein if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

10. The data transmission method according to claim 6, wherein the HARQ-ACK feedback information corresponding to the PDSCH with repetition transmissions is HARQ-ACK feedback information corresponding to the last transmission of the PDSCH with repetition transmissions.

11. A terminal device, comprising a transceiver, a memory, a processor, and a computer program stored on the memory and executed by the processor, wherein
the transceiver is configured to receive PDSCH;
the processor is configured to determine a size of a semi-static Hybrid Automatic Repeat Request-Acknowledge (HARQ-ACK) codebook according to a number of repetition transmissions of the PDSCH; and perform a corresponding HARQ-ACK feedback for the PDSCH with repetition transmissions according to the determined size of the semi-static HARQ-ACK codebook,
wherein the processor is further configured to:
determine a quantity of PDSCHs with repetition transmissions with associated HARQ-ACK feedback in a slot or in a Physical Uplink Control Channel (PUCCH) according to the number of repetition transmissions of the PDSCH and a quantity of downlink transmissions with associated HARQ-ACK feedback in the slot or in the PUCCH; and
determine the size of the semi-static HARQ-ACK codebook according to the quantity of PDSCHs with repetition transmissions with associated HARQ-ACK feedback in the slot or in the PUCCH.

12. The terminal device according to claim 11,
wherein the quantity of downlink transmissions with associated HARQ-ACK feedback in a slot or in a PUCCH may be at least one of:
the quantity of downlink transmissions determined according to each value in a feedback timing set for the timing between the PDSCH and a corresponding HARQ-ACK;
the quantity of downlink transmissions determined according to a range of slot determined by a maximum value and a minimum value in a feedback timing set for the timing between the PDSCH and a corresponding HARQ-ACK;
the quantity of downlink transmissions determined according to each value in a feedback timing set for the timing between the PDSCH and a corresponding HARQ-ACK and a time domain resource allocation candidate set for a downlink transmission in each slot;
the quantity of downlink transmissions determined according to a range of slot determined by a maximum value and a minimum value in a feedback timing set for the timing between the PDSCH and a corresponding HARQ-ACK and a time domain resource allocation candidate set for a downlink transmission in each slot.

13. The terminal device according to claim 12, wherein the processor is further configured to:
calculate the quantity of PDSCHs with repetition transmissions with associated HARQ-ACK feedback in the slot or in the PUCCH according to a formula $$M = \left\lceil \frac{B}{A} \right\rceil,$$

wherein M is the quantity of PDSCHs with repetition transmissions with associated HARQ-ACK feedback in the slot or in the PUCCH, B is the quantity of downlink transmissions with associated HARQ-ACK feedback in the slot or in the PUCCH, and A is the number of repetition transmissions of PDSCHs, $\lceil\ \rceil$ is a rounded up operator; and/or wherein the transceiver is further configured to:

map HARQ-ACK feedback information corresponding to the PDSCH with repetition transmissions to the semi-static HARQ-ACK codebook according to the position of the PDSCH with repetition transmissions within the quantity of M PDSCHs with repetition transmission with associated HARQ-ACK feedback in the slot or in the PUCCH.

14. The terminal device according to claim 13, wherein if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

15. The terminal device according to claim 11, wherein the HARQ-ACK feedback information corresponding to the PDSCH with repetition transmissions is HARQ-ACK feedback information corresponding to the last transmission of the PDSCH with repetition transmissions.

16. A network device comprising a transceiver, a memory, a processor, and a computer program stored on the memory and executed by the processor, wherein the transceiver is configured to: transmit PDSCH;

the processor is configured to determine a size of a semi-static HARQ-ACK codebook according to a number of repetition transmissions of the PDSCH;

the transceiver is further configured to receive HARQ-ACK feedback information corresponding to the PDSCH with repetition transmissions according to the determined size of the semi-static HARQ-ACK codebook, wherein the processor is further configured to:

determine a quantity of PDSCHs with repetition transmissions with associated HARQ-ACK feedback in a slot or in a PUCCH according to the number of repetition transmissions of the PDSCH and a quantity of downlink transmissions with associated HARQ-ACK feedback in the slot or in the PUCCH; and determine the size of the semi-static HARQ-ACK codebook according to the quantity of PDSCHs with repetition transmissions with associated HARQ-ACK feedback in the slot or in the PUCCH.

17. The network device according to claim 16, wherein the quantity of downlink transmissions with associated HARQ-ACK feedback in a slot or in a PUCCH is at least one of the following: the quantity of downlink transmissions determined according to each value in a feedback timing set for the timing between the PDSCH and a corresponding HARQ-ACK; the quantity of downlink transmissions determined according to a range of slot determined by a maximum value and a minimum value in a feedback timing set for the timing between the PDSCH and a corresponding HARQ-ACK; the quantity of downlink transmissions determined according to each value in a feedback timing set for the timing between the PDSCH and a corresponding HARQ-ACK and a time domain resource allocation candidate set for a downlink transmission in each slot; the quantity of downlink transmissions determined according to a range of slot determined by a maximum value and a minimum value in a feedback timing set for the timing between the PDSCH and a corresponding HARQ-ACK and a time domain resource allocation candidate set for a downlink transmission in each slot.

18. The network device according to claim 17, wherein the processor is further configured to:

calculate the quantity of PDSCHs with repetition transmissions with associated HARQ-ACK feedback in the slot or in the PUCCH according to a formula $$M = \left\lceil \frac{B}{A} \right\rceil,$$

wherein M is the quantity of PDSCHs with repetition transmissions with associated HARQ-ACK feedback in the slot or in the PUCCH, B is the quantity of downlink transmissions with associated HARQ-ACK feedback in the slot or in the PUCCH, and A is the number of repetition transmissions of PDSCHs, $\lceil\ \rceil$ is a rounded up operator; and/or the transceiver is configured to:

receive HARQ-ACK feedback information corresponding to the PDSCH with repetition transmissions in a corresponding position of the semi-static HARQ-ACK codebook according to the position of the PDSCH with repetition transmissions within the quantity of M PDSCHs with repetition transmission with associated HARQ-ACK feedback in the slot or in the PUCCH.

19. The network device according to claim 18, wherein if a position of the last transmission of repetition transmissions of a PDSCH corresponds to positions (A*i+1)th to (A*(i+1))th of B downlink transmission positions, the PDSCH with repetition transmissions is the (i+1)th PDSCH with repetition transmissions within the quantity of M PDSCHs with repetition transmissions with associated HARQ-ACK feedback in the slot or in the PUCCH, and i is a positive integer greater than or equal to 0.

20. The network device according to claim 16, wherein the HARQ-ACK feedback information corresponding to the PDSCH with repetition transmissions is HARQ-ACK feedback information corresponding to the last transmission of the PDSCH with repetition transmissions.

\* \* \* \* \*